J. B. CLAY.
GATE.
APPLICATION FILED JUNE 25, 1910.
1,017,248.
Patented Feb. 13, 1912.
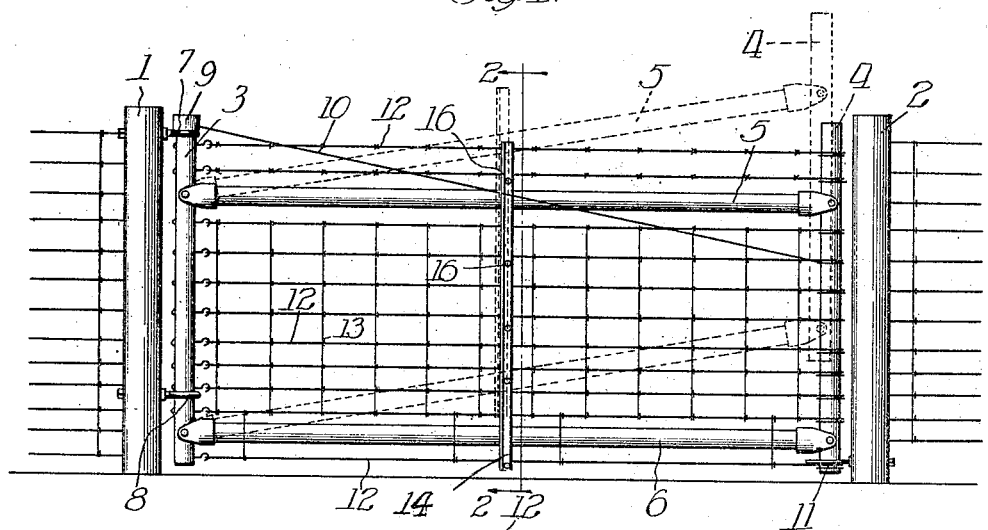
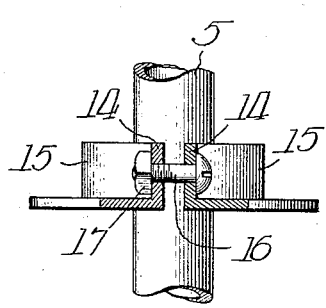
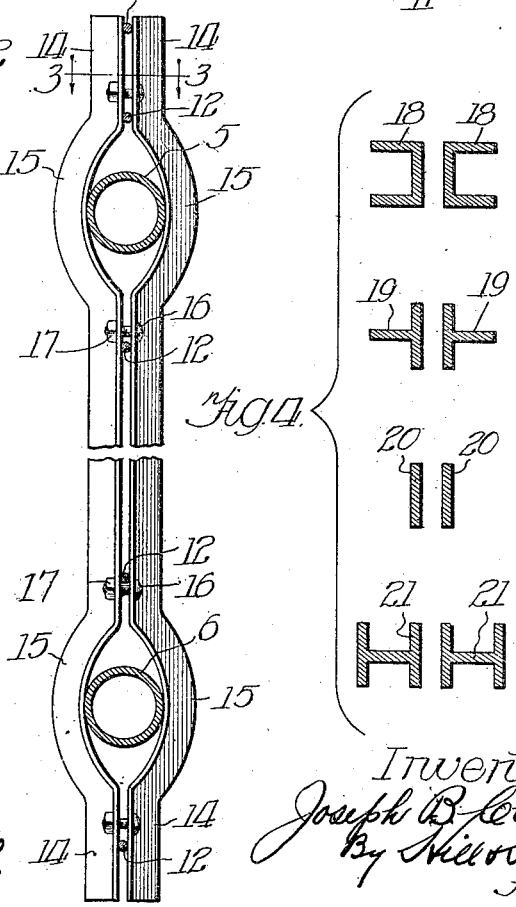
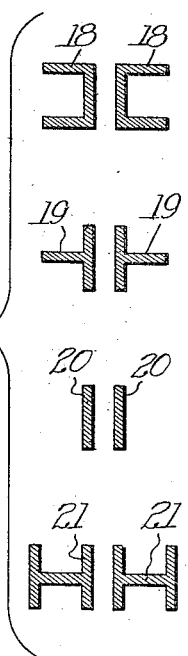
Witnesses:
Robert H. Weir
Charles J. Cobb
Inventor:
Joseph B. Clay
By Hill & Hill
Attys

UNITED STATES PATENT OFFICE.

JOSEPH B. CLAY, OF CEDAR FALLS, IOWA.

GATE.

1,017,248.  Specification of Letters Patent.  Patented Feb. 13, 1912.

Application filed June 25, 1910. Serial No. 568,778.

*To all whom it may concern:*

Be it known that I, JOSEPH B. CLAY, a citizen of the United States, residing at Cedar Falls, in the county of Blackhawk and State of Iowa, have invented certain new and useful Improvements in Gates, of which the following is a description.

My invention belongs to that class of devices known as gates and relates particularly to an improved form of gate attachment comprising a strut or brace and wire retainer arranged to maintain the wires in position and prevent them from sagging or bagging, as well as making each part of the gate share the strain or load.

The invention has among its objects the production of a simple, convenient, efficient and satisfactory device of the kind described for use wherever found applicable, it being particularly applicable for what is known as wire gates with either rigid or adjustable frames.

Owing to the particular construction used expensive and special fastenings or fittings are unnecessary and the same may be applied to a complete gate without requiring the dismantling of the gate or reconstruction in any way.

To this end my invention consists in the novel construction, arrangement and combination of parts herein shown and described and more particularly pointed out in the claim.

In the drawings wherein like reference characters indicate like or corresponding parts; Figure 1 is a view in elevation of a gate showing my attachment applied thereto, Fig. 2 is an enlarged sectional view taken substantially on line 2—2 of Fig. 1, Fig. 3 is a sectional view taken substantially on line 3—3 of Fig. 2, Fig. 4 shows several modified constructions or shapes of the parts 14.

Referring to the drawings, 1 and 2 represent the fence or gate posts, 3 and 4 the end bars of the gate frame, and 5 and 6 the cross bars of the gate frame, the gate shown being of the tilting type, in which the free end may be raised during the swinging of the gate or when desired. In the gate shown the end bar 3 is pivotally supported and maintained in position relative to the fence post 1 by means of supports 7 and 8 and a coöperating cap 9 or their equivalents for the purpose. The cross bars 5 and 6 of which there may be any number arranged as desired, are pivotally secured to the two end bars 3 and 4 so that the gate may be tilted or raised as indicated by the dotted lines in Fig. 1 in opening or closing, or when desired, thereby avoiding any obstruction or causing the bottom of the free end to drag on the ground. The free end of the gate is preferably normally supported by a guy wire or rod 10, the same being secured to the end bar 3 and arranged to adjustably coöperate with the end bar 4. Any suitable means may be employed for maintaining the gate closed, as for example, a forked member 11 or a chain (not shown) or their equivalents for the purpose. As shown, the gate is preferably provided with wire or wire mesh 12 and 12—13, which may be secured to the end bars or the equivalent in any suitable way.

My preferred form of brace and stiffener or strut comprises mating or coöperating parts 14—14 which are secured with one part on each side of the gate, with the cross bars and wire arranged therebetween. The parts may be secured together in any satisfactory manner, preferably by means of suitable bolts or screws 16 and nuts 17. The parts 14 are preferably offset as at 15 to permit the cross bars to pass therethrough, the form of offset being preferably as shown in order to permit the tilting of the gate. As shown in Figs. 1, 2 and 3, the members 14 are made of angle iron so that the same are very stiff and so that it not only stiffens the gate and wire mesh but is also not easily bent in itself. In Fig. 4 the same is shown as consisting of channel bars 18 or T-bars 19, flat bars 20 or I-bars 21. In either of these constructions the bolts and nuts 16 and 17 or their equivalents may be employed for securing the parts together.

It will be noted in this construction that the wires above or below the cross bars on the gate are held securely in their position so that if they were to get loose they will be held where they belong and cannot be dragged down out of the way by stock rubbing on them. Further, that all the wires of the mesh or if only barbed wires, are also held securely in position and prevented from bagging out in the course of time. And further, that the brace makes either or each of the cross bars 5 and 6, etc., share the load of the other when either is put to any severe strain. The brace being made in two pieces and secured together substantially as described, holds the wires between the two pieces without any special fastenings being necessary.

The brace preferably only touches at substantially one point on each side of the cross bars so that it does not interfere in any way with the adjustment of the outer end of the gate and does not require special fastening or pivots at this point. The particular fastening or brace may be placed on gates when manufactured and sold or may be readily applied to gates already in use without requiring skill, special tools or dismantling of the gate.

Having thus described my invention, it is obvious that various immaterial modifications may be made in the same without departing from the spirit of my invention, hence I do not wish to be understood as limiting myself to the exact form, arrangement, construction, combination of parts or uses shown, described or mentioned.

What I claim as new, and desire to secure by Letters Patent is:

The combination with a gate of the character set forth including end bars and cross bars pivotally connecting said end bars, of a detachable brace comprising mating members extending transversely of said cross bars with one on each side thereof, said members being offset to provide elongated openings therebetween at the cross bars permitting relative movement between the brace and cross bars in the vertical adjustment of the gate, and clamping means positioned to one side of the cross bars to maintain said brace members in engagement with each cross bar at substantially one point on each side thereof to provide a pivotal connection between the brace and cross bars.

In testimony whereof, I have hereunto signed my name in the presence of two subscribing witnesses.

JOSEPH B. CLAY.

Witnesses:
 GEORGE F. WOOD,
 DAVINA CRASER.